United States Patent [19]

Olsen

[11] 4,205,485
[45] Jun. 3, 1980

[54] TRAY CONSTRUCTION FOR GROWING PLANTS

[75] Inventor: Robert C. Olsen, Streamwood, Ill.

[73] Assignee: Illinois Tool Works Inc., Chicago, Ill.

[21] Appl. No.: 734,148

[22] Filed: Oct. 20, 1976

[51] Int. Cl.² ............................ A01G 9/02; A01G 9/10
[52] U.S. Cl. ........................................... 47/77; 47/39; 47/86
[58] Field of Search .................. 47/66, 73, 77, 75, 84, 47/86, 87, 39

[56] References Cited

U.S. PATENT DOCUMENTS

| | | | |
|---|---|---|---|
| 695,484 | 3/1902 | Parker | 47/77 |
| 780,118 | 1/1905 | Mosier | 47/66 X |
| 3,542,210 | 11/1970 | Sorensen | 47/86 X |
| 3,660,934 | 5/1972 | Pollack et al. | 47/84 |
| 3,810,329 | 5/1974 | Lecuvu et al. | 47/87 |
| 3,825,126 | 7/1974 | Pohl et al. | 47/86 X |
| 3,889,416 | 6/1975 | Bergeron | 47/86 |
| 3,931,694 | 1/1976 | Krikorian | 47/87 |
| 4,031,832 | 6/1977 | Edwards | 47/77 X |

FOREIGN PATENT DOCUMENTS 1414605  9/1965  France .......................... 47/73

OTHER PUBLICATIONS

Planting Gun and Bullet, 6/68, Agri. Engineering, Fig. 1, p. 336, "Styrene Bullets and Trays."
Pp. 137 & 138, "Proceedings of the North American Containerized Forest Tree Seedling Symposium," #68, The Great Plains Agricultural Council printed by GPO.

*Primary Examiner*—Edgar S. Burr
*Assistant Examiner*—Steven A. Bratlie
*Attorney, Agent, or Firm*—Thomas W. Buckman; Robert W. Beart; Edward L. Benno

[57] ABSTRACT

A tray construction for growing plants in which the construction comprises a one-piece substantially rigid tray frame with a plurality of plant frames mounted in the tray frame to define a plurality of plant growing containers interconnected in a unitary assembly. The tray frame may be conveniently molded from a foamed thermoplastic material and essentially comprises a plurality of substantially rigid tubular members vertically aligned and integrally interconnected in a rectangular array of a plurality of adjacent rows. The open spaces between diagonally opposed tubular members permit air to pass between the upper and lower sides of the tray frame. The plant frames are preferably frictionally held within the tubular members, and each plant frame essentially comprises a base section and a plurality of ribs secured to the base section to upstand therefrom. Each of the plant frames is telescopically mounted in one of the tubular members with the base section in a spaced relationship with the lower end of the tubular member to provide drainage openings therebetween. The ribs extend upwardly within and against the inner walls of the tubular members.

14 Claims, 7 Drawing Figures

TRAY CONSTRUCTION FOR GROWING PLANTS

BACKGROUND OF THE INVENTION

Plant growing containers composed of a tray having tubular pockets or cells in which a substantial number of individual plants may be grown, and which include plant holding frames which are mounted in the cells of the tray are known in the prior art. Further, such plant frames in a substantially skeletal form are also known, and such plant frames are often used as planting or transplanting aids when they are removed from the tray with a growing plant therein.

Common problems encountered in the use of the prior art devices involve the problem of making tray and frame constructions that will not retard plant root growth in the construction, but that will permit plant roots to grow in a healthy substantially normal condition therein, the problem of making container and frame constructions that will provide for proper drainage of water from the growing medium in the construction, the problem of making container and frame constructions that will permit the growing plant and frame to be easily removed from the tray for transplanting or outplanting, and the problem of making tray and frame constructions that will enable the frame with the plant growing therein to be inserted with the plant into ground and from which the plant roots can continue to grow in a normally healthy and vigorous manner and absent any root encirclement or root misdirection.

One or more of the noted problems may be solved by various known container and frame constructions, but no such constructions are known that will economically and efficiently solve all of the noted problems.

SUMMARY OF THE INVENTION

The tray construction of the present invention utilizes a form of plant frame shown in the U.S. patent application of Byrant Edwards, Ser. No. 670,918, filed Mar. 26, 1976 now U.S. Pat. No. 4,031,832. The plant frames of the Edwards' application utilize thin flexible sleeves mounted about the plant frames to form complete plant growing containers. As opposed to the containers of the noted Edwards' application, the tray construction of the subject invention does not include individual sleeves and does not require additional trays for holding the containers in an upright growing position in a greenhouse. In the subject invention the tray itself cooperates with the plant frames to define individual plant containers and the tray holds the defined containers in a group in upright growing position in a greenhouse.

Briefly, the tray construction of the present invention comprises a one-piece substantially rigid or self-supporting tray frame with a plurality of plant frames mounted in the tray frame to define a plurality of individual plant growing containers interconnected in a unitary assembly.

The tray frame is preferably molded from a foamed thermoplastic material in the general shape of a rectangular block. A plurality of vertically aligned holes are formed in the tray frame and those holes extend from the upper surface to the lower surface of the tray frame. The holes are arranged in a rectangular pattern of adjacent rows. Preferably, somewhat diamond-shaped holes are formed in the tray frame between each group of four container holes so that the tray frame may be described as essentially comprising a plurality of substantially rigid tubular members vertically aligned and integrally interconnected in a rectangular array of a plurality of adjacent rows. Dependent upon the manner in which the plant frames are mounted in the container holes, the tray frame may be supported on a table surface by the lower ends of the plant frames, or the underside of the tray frame may be provided with depending legs to support the tray frame on a table surface independently of the plant frames.

Each of the plant frames, which are preferably frictionally held within the plant holes in the tray frame, basically comprises an imperforate base section and a plurality of ribs secured in a spaced-apart relationship to each other about the periphery of the base section to upstand therefrom. Each of the plant frames is telescopically mounted in one of the plant holes of the tray frame with the imperforate base section of the plant frame cooperating in a spaced relationship with the lower end of the plant holes in the tray frame to provide drainage openings therebetween. The ribs of each plant frame extend upwardly within and against the inner wall of a plant hole in the tray frame.

In a preferred embodiment, a circumferentially incomplete ring is provided on the upper ends of the ribs of each plant frame. In a further preferred embodiment, the upper surface of the base section of each plant frame is domed upwardly. In still another preferred embodiment, the underside of the base section of each plant frame is provided with a depending somewhat bullet-shaped nose section. That bullet-shaped nose section may be integrally formed with the plant frame or formed separately therefrom and with means for connecting the nose section to a plant frame when desired.

In use the complete tray construction is conveniently set upon a rack or table-like surface in a greenhouse with the plant containers defined by the plant holes and the plant frames filled with an appropriate growing medium for the plant to be grown therein and with a plant cutting or seed inserted or otherwise associated with the growing medium. It is intended that the plants in each of the individual defined plant containers in the tray construction be grown therein until the plants are ready for further transplanting or outplanting. Advantageously, in a construction of the invention, each plant frame substantially retains or contains the root structure and growing medium of any plant growing therein, and thus the root structure and growing medium can be easily removed intact from the tray frame by telescopically withdrawing a plant frame from its associated plant hole, and the planting frame, growing medium and plant can be handled as a unit with a minimum falling away or breaking apart of the plant root mass and the growing medium under normal handling conditions. In a greenhouse growing procedure that easy plant removal arrangement conveniently permits culling of poorly growing plants and subsequent replantings within the total plant array in the tray construction.

While a plant is growing in one of the defined plant containers in the tray construction, the vertical ribs of the plant frame will tend to prevent root spiraling of the plant growing therein. Further, the domed upper surface of the base section of the plant frame will tend to prevent the root condition called "J-rooting" in the art. As the roots of the plant in their normal downward directon of growth reach the domed surface, they will be directed downwardly and radially outwardly over the domed surface toward the drainage openings, and thereby effectively be prevented from turning around and growing upwardly in a pattern like the letter "J".

In transplanting a plant growing in one of the defined plant containers, it is intended that each plant frame with the plant growing therein be telescopically removed from the tray frame and thereafter be replanted without separating the growing plant and its growing medium from the plant frame. The plant frame will present substantially no restrictions on the further growth of such a transplanted plant.

When the plant frame is provided with the bullet-shaped nose, the upper end of the nose section may be provided with an annular flange to receive a tubular planting tool in vertical abutment thereagainst. In that arrangement, a plant frame may be withdrawn from the tray frame and telescopically inserted into a tubular planting tool, such as shown in the above noted patent application of Bryant Edwards, with the bullet-shaped nose section depending therefrom. The tubular planting tool may then be pushed into the open ground and thereafter telescopically withdrawn from the plant frame to leave the plant frame with the plant growing therein outplanted.

The primary object of the present invention is to provide a tray construction for growing plants which are to be later transplanted or outplanted, wherein the tray construction is easily conveniently used in known greenhouse procedures and from which individual plants may be taken in a plant supported arrangement for convenient and easy later transplanting and outplanting of the growing plant.

Other objects and features of the invention will be apparent upon a perusal of the hereinafter following detailed description read in conjunction with the drawings.

DETAILED DESCRIPTION OF THE PREFERRED EMBODIMENT

Figure 1:
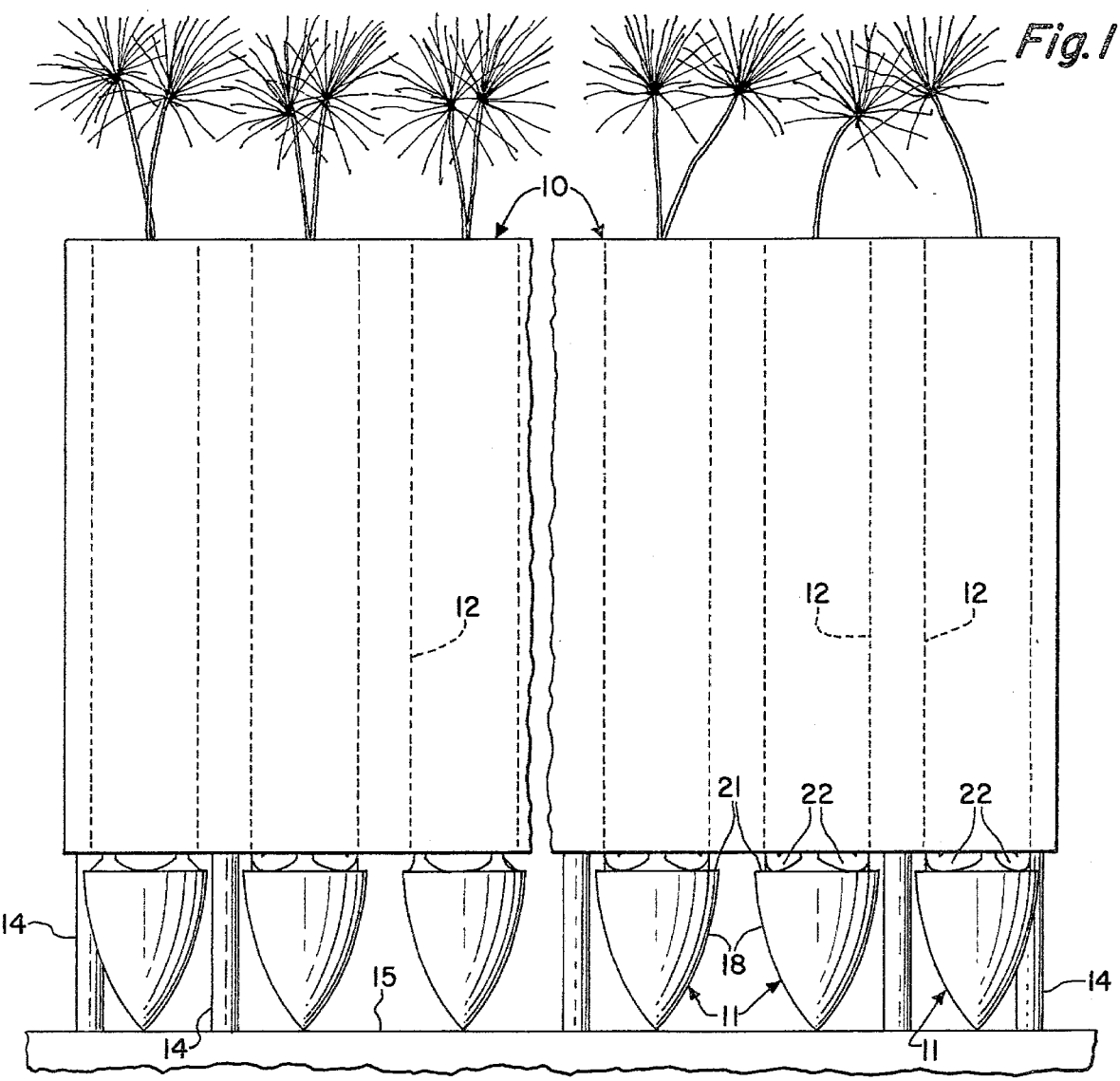
FIG. 1 is a side elevational view of a tray construction made according to one embodiment of the present invention.
Figure 2:
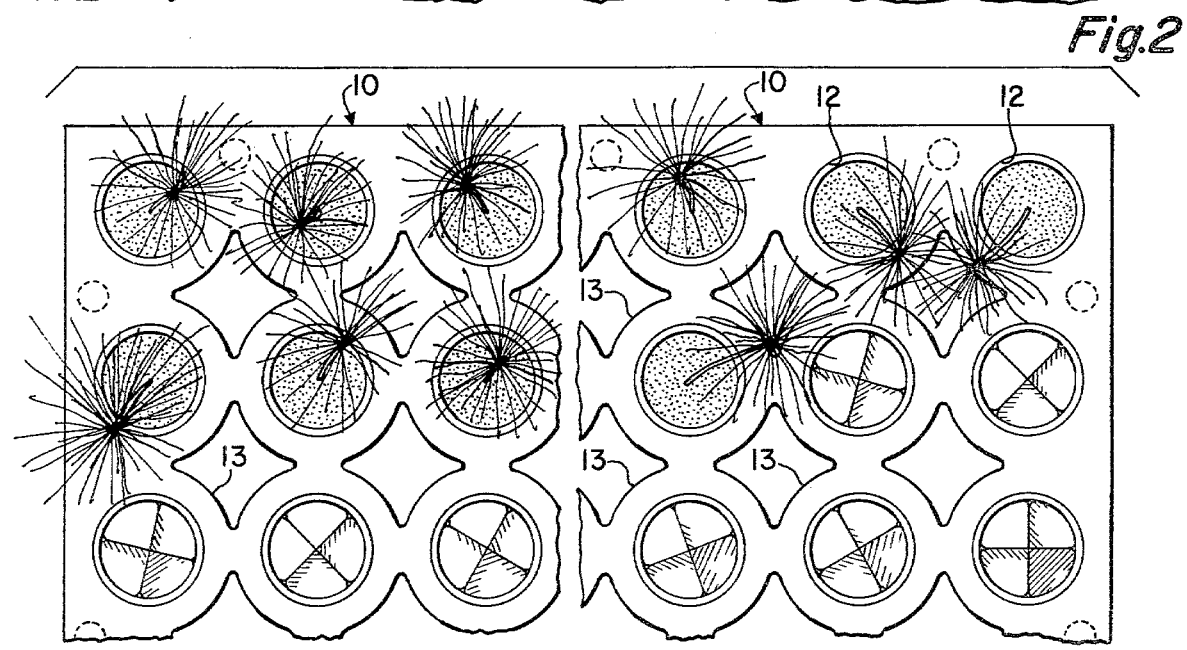
FIG. 2 is a top plan view of the tray construction shown in FIG. 1.

The tray construction of the present invention comprises, as shown in FIGS. 1 and 2, a tray frame 10 and a plurality of plant frames 11. The plant frames 11 are preferably shaped as the container frames shown in the United States patent application of Bryant Edwards, Ser. No. 670,918, filed Mar. 26, 1976, and reference is made to that application for a full description of the manner in which the plant frames 11 can be made.

The tray frame 10 is preferably molded from a foamed thermoplastic material, such as polystyrene, in the general shape of a rectangular block substantially as shown in the two fragmentary views in FIGS. 1 and 2. A plurality of vertically aligned plant holes 12 are formed in the tray frame 10, and those holes extend from the upper surface to the lower surface thereof as shown in FIG. 1. As shown in FIG. 2, the plant holes 12 are arranged in a rectangular pattern of adjacent rows. Preferably, somewhat diamond-shaped holes 13 are formed in the tray frame between each group of four holes 12 as shown in FIG. 2. In that described construction, the tray frame 10 may be described as a plurality of substantially rigid tubular members vertically aligned and integrally interconnected in a rectangular array of a plurality of adjacent rows. The function of the holes 13 is to permit air movement between the lower and upper sides of the tray frame 10. Such air movement, and often under pressure, is generally used in greenhouse operations to prevent the top growth of the plants that are growing in the tray construction from excessively damp or moist conditions.

In the embodiment of FIGS. 1 and 2, the bottom wall of the tray frame 10 is provided with a plurality of legs or posts 14 for supporting the tray frame 10 upon a table-like surface 15 in a greenhouse with the underside of the tray frame 10 spaced at least a certain distance from the top of the table-like surface 15. It should be understood that the table-like surface 15 need not be a solid surface, but may comprise an open wire mesh surface or a plurality of horizontally spaced-apart joists.

Figure 4:
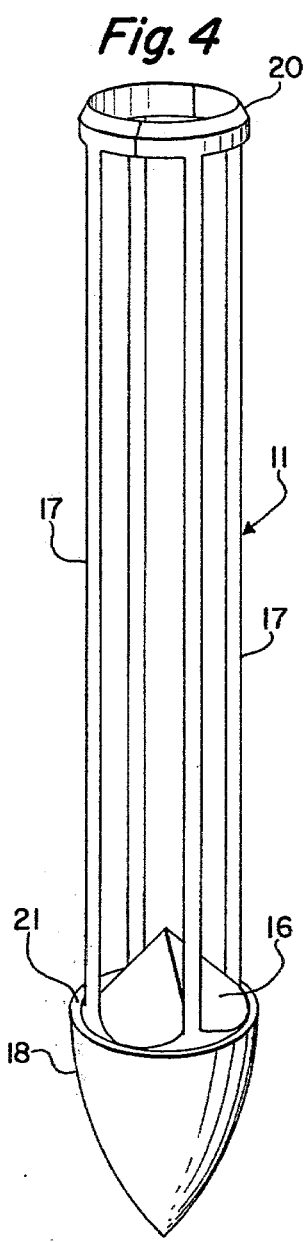
FIG. 4 is an isometric view of a plant frame such as shown in FIGS. 1-3 removed from the tray frame and absent any plant or growing medium.
Figure 6:
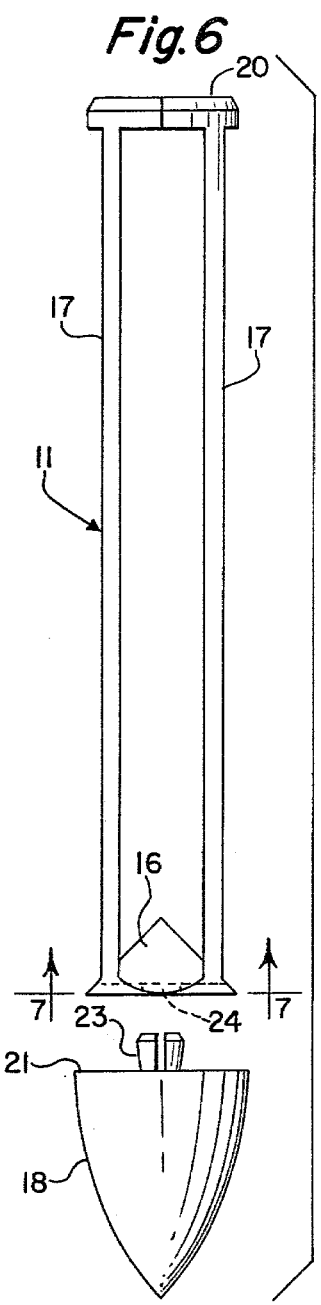
FIG. 6 is a side elevational view of a plant frame such as shown in FIG. 4 with the nose section of the base section removed.
Figure 7:
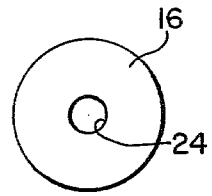
FIG. 7 is a view of the base section of the plant frame shown in FIG. 6 and taken substantially along the line 7—7 of FIG. 6.

Each of the plant frames 11 may be constructed as shown in FIGS. 4, 6 and 7. As shown in FIG. 4, a plant frame 11 comprises a base section 16 and a plurality of ribs 17. In a preferred embodiment the ribs 17 are four in number, and the four ribs 17 are positioned in a spaced-apart relationship to each other about the periphery of the base section 16 to upstand therefrom. The upper surface of the base section 16 is formed as an imperforate surface or a surface devoid of any openings capable of passing water therethrough. The function of that imperforate upper surface of the base section 16 is to avoid having any openings into which the roots of a plant growing in the plant frame 11 might enter and thereby be strangled. In a preferred form of the plant frame 11, the upper surface of the base section 16 is domed upwardly, and one convenient shape for that upwardly domed surface is that of a four-sided pyramid. Further, advantageously the lower end of each of the ribs 17 is positioned to be intersected by a line drawn along the junction of two adjacent walls of the four sides of the pyramid. Further advantageously, each of the ribs 17 may be formed to be triangular in cross section with the base of each triangle lying on a circle drawn about and adjacent to the periphery of the base section 16, and with the apex of each triangle on the line of intersection between two adjacent sidewalls of the pyramid. In another preferred form, such as that shown for example in FIGS. 6 and 7, the radially outward surface of each rib 17 lies on the periphery of the base section 16 and the periphery of the base section 16 is defined by a circle of a diameter substantially equal or slightly less than the diameter of the plant holes 12 in the tray frame 10. In such an arrangement, and absent the bullet-shaped depending nose 18, the plant frame 11 can be telescopically inserted in one of the holes 12 in the tray frame 10 and frictionally held therein by some means such as a radially outwardly extending projection or boss on the plant frame 11. Further in that arrangement, the plant frame 11 can be inserted or removed from either the upper end or the lower end of the tray frame 10.

In a preferred embodiment a ring 20 is integrally formed on the upper ends of the ribs 17. The ring 20 is positioned in a plane perpendicular to the longitudinal axis of the plant frame 11. The ring 20 may be made in a number of different forms. If the plant to be grown in the tray construction of the subject invention is not expected to have a stem growth greater in diameter than the internal diameter of the ring 20, the ring 20 may be circumferentially continuous. If it is expected that the stem of the plant to be grown in the plant frame will grow to a stem diameter greater than the internal diameter of the ring 20, the ring 20 may be constructed so as to be easily circumferentially frangible, or it may be circumferentially discontinuous at one or more circumferential positions. In the embodiment shown in FIG. 4 the ring 20 is shown as circumferentially discontinuous at two diametrically opposed positions.

If a circle traced about the outer wall surfaces of the ribs 17 and the periphery of the base section 16 is less than the diameter of the plant holes 12, the outer diameter of the ring 20 may be made sufficiently large to cause the outer surface of the ring 20 to firmly frictionally engage the inner upper wall of a plant hole 12 to hold the plant frame 11 therein. In that arrangement the plant frame 11 may still be inserted or removed from a plant hole 12 in the tray frame 10 from either the upper or lower side thereof. If insertion or removal of a frame 11 is desired only from the upper surface of the tray frame 10, the ring 20 may be made with an outer diameter of radially outwardly extending shoulder greater than the diameter of the plant holes 12 so that when a plant frame 11 is inserted into a plant hole 12 the radially outward underside of the ring 20 will rest upon the upper surface of the tray frame 10 to essentially hang the plant frame 11 from the upper surface of the tray frame 10.

In any of the foregoing described embodiments, the base sections 16 must be constructed or arranged so that drainage openings are provided between the outer periphery of a base section 16 and the lower end of a plant hole 12.

In a preferred embodiment where the plant frame 11 with the growing medium and a plant growing therein is to be injection transplanted or outplanted, the underside of the base section 16 is advantageously provided with a depending nose cone 18. The nose cone 18 may be bullet-shaped to have a suitable ground penetration configuration. Such a nose cone 18 is shown in FIGS. 4 and 6. The upper radially outward edge of the nose cone 18 is further formed to have an annular shoulder 21. The function of the annular shoulder 21 is to receive the lower edge of a tubular planting tool in vertical abutment thereupon with the ribs 17, root mass and growing medium of a plant growing therein extending upwardly and within the tubular planting tool. If the tubular planting tool is provided with a longitudinal slot extending upwardly from the lower edge thereof, the plant frame 11 may be inserted therein with the top growth of the plant extending through the slot and outwardly of the planting tool.

In one preferred form of the plant frame 11, the nose cone 18 is integrally molded with the base section 16. In such an arrangement the plant frame 11 is preferably telescopically inserted or removed from the tray frame 10 from the underside thereof. Such an embodiment of the plant frames 11 may be mounted in the tray frame 10 as shown in FIG. 1. In such an arrangement, the legs or posts 14 should be long enough to provide a vertical spacing between the annular shoulder 21 and the underside of the tray frame 10. That vertical spacing ensures that each plant frame 11 in cooperation with a plant hole 12 of the tray frame 10 into which it has been telescopically inserted will define a complete plant growing container with drainage openings 22 at the lowered end thereof, such as may be seen in FIG. 1. In an arrangement such as shown in FIG. 1, the frictional retention between each plant frame 11 and the inner wall surface of the holes 12 need not be firm since the table-like surface 15 upon which the completed tray construction rests will support the plant frames 11 in proper positions axially of the holes 12.

If the plant frames 11 are made in accordance with the embodiment shown in FIGS. 6 and 7 wherein the nose section 18 is removable from the base section 16, the legs or posts 14 may be made shorter by a distance represented by the height of the nose cone 18 shown in FIG. 6. The underside of the base section 16 of each plant frame 11, shown in FIG. 6, will then rest upon or engage the upper surface of the table-like surface 15.

In the embodiment shown in FIG. 6, the central upper surface of the nose cone 18 is provided with a split post 23 that may be snap fitted into an opening 24 provided in the bottom wall surface of the base section 16 of the plant frame 11.

In all of the various described embodiments of the plant frame 11, it is contemplated that the plant frames 11 be preferably molded from a relatively low cost material such as polystyrene because in uses of the tray construction of the invention it is intended that the plant frames 11 not be reused, but planted with the plant growing therein in the transplanting or outplanting operation.

Figure 3:
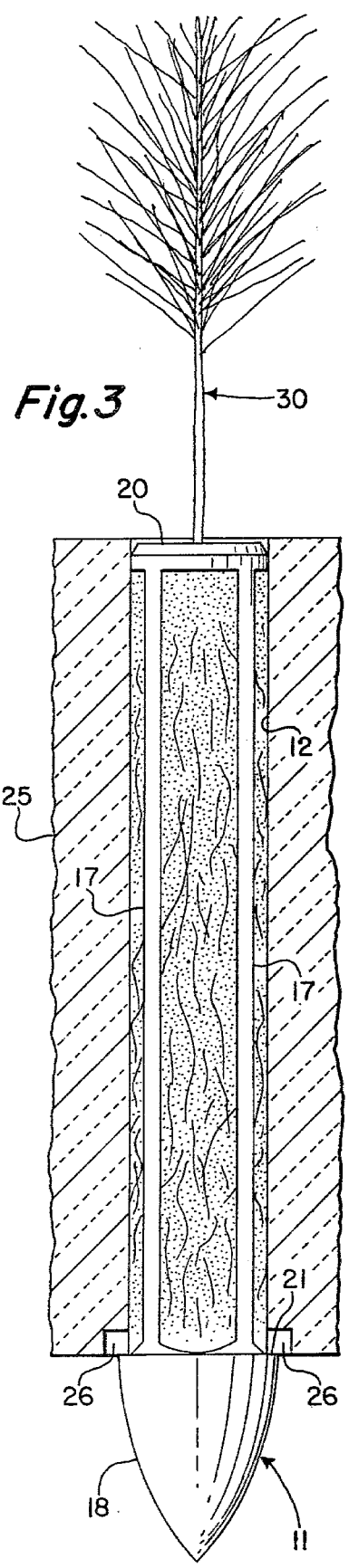
FIG. 3 is an enlarged cross-sectional view of one defined planter container in another embodiment of the invention.
Figure 5:
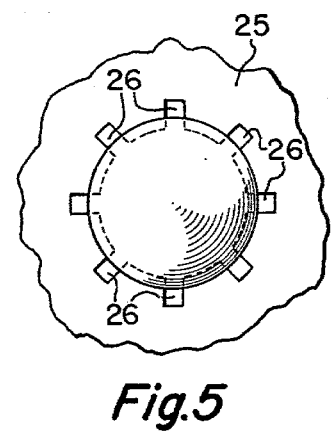
FIG. 5 is a bottom plan view of the construction shown in FIG. 3.

The embodiment of the tray construction of the subject invention shown in FIGS. 3–5, contemplates a tray frame construction 25 in which the posts or legs 14 have been omitted. In such an arrangement the lower ends of the nose sections 18 are intended to rest upon the table-like surface 15 and support the entire tray construction. In such an arrangement, to avoid possible closing of the drainage openings, the lower end of each tray hole 12 is provided with a plurality of radially extending slots 26 shown in FIGS. 3 and 5. The radial slots 26 have a radial length such that they extend radially outwardly of the annular shoulder 21 of the nose section 18. Thus, as may be seen in FIG. 3, the annular shoulder 21 abuts the bottom wall of the tray frame 25 to support the tray frame 25 thereon. In that arrangement, the uncovered outer ends of the slots 26 form the drainage openings for the defined plant containers.

In use, a tray construction of the invention is one of its various described embodiments is placed, generally in a greenhouse, upon some supporting surface for the growing of individual plants in each of the individual plant containers defined by each plant frame 11 and its associated plant hole 12 in the tray frame. Conventionally each of the defined containers is filled with an appropriate growing medium and a plant seed or cutting is then inserted into or otherwise appropriately associated with the growing medium in each container. Various arrangements known in the art may be used for filling the plant containers. In one known system, growing medium is piled on top of the tray construction and wiped into the plant containers while the tray construction is vibrated to appropriately compact the growing medium. If conifers are to be grown from seed in the tray construction, the growing medium in each plant container is generally then pushed down about one-half inch below the upper edge of the tray construction, and a conifer seed is placed upon the growing medium. A layer of small gravel such as crushed granite is then placed over the seed on the growing medium. The individual containers are then watered and oftentimes treated with fertilizers to ensure a healthy growth of a plant in each container. As a plant, such as the conifer seedling represented by the plant 30 as shown in FIG. 3, grows in its container a substantial root mass will form throughout the growing medium and within the confines of the ribs 17 of the plant frame 11. The ribs 17 will tend to prevent the growing roots from spiraling in the defined container, and when a growing root engages one of the ribs 17 it will tend to direct the root in a normal downward direction. As the plant roots reach the upper surface of the base section 16 they will be directed downwardly and outwardly toward the drainage openings. As the roots reach the drainage openings they will be air pruned thereat.

When the plant is ready for transplanting or outplanting, the plant frame 11 with the growing medium and plant therein is pulled from the tray frame and thereafter transplanted or outplanted as a unit. Where a furrow or other ground opening at the transplanting site has been provided, a plant frame 11 without a nose cone 18 may be inserted in the prepared opening and with any remaining opening about the plant frame 11 then being closed by additional soil or tamping. If the plant is to be outplanted by an injection method, the plant frame 11 with a nose cone 18 is inserted in a tubular planting tool having a lower edge engaging the annular ring 21. The planting tool is then pushed into the ground at the outplanting site to an appropriate depth which generally is one in which the ring 20 is at about ground level. The planting tool may then be withdrawn leaving the frame 11 and the plant growing therein in the ground and the ground thereabout may be tamped to place the roots of the plant in firm contact with the adjoining soil at the outplanting site for further healthy growth of the plant roots out of the plant frame 11 between the ribs 17 and into the adjoining soil.

The invention contemplates that the tray frame 10 can be reused after appropriate cleaning and with the insertion of new plant frames 11 therein.

Having described the invention, it is to be understood that changes can be made in the described embodiments by one skilled in the art within the spirit and scope of the claims.

I claim:

1. A tray construction for growing plants, said tray construction comprising a tray frame and a plurality of plant frames, said tray frame comprising a plurality of substantially rigid tubular members substantially open at both ends thereof with the upper and lower opening being of diameters substantially equal to the internal diameter of the tubular members in the regions of the respective upper and lower ends thereof and having imperforate walls and being vertically aligned and integrally interconnected in a rectangular array of a plurality of adjacent rows, each of said plant frames releasably mounted substantially within one of said tubular members, each of said plant frames comprising a base section devoid of any openings capable of passing water therethrough, the outer periphery of each base section positioned in a spaced relationship with the lower end of said one of said tubular members to provide a closed bottom wall across said lower end of said one of said tubular members said spaced relationship defining drainage openings between the outer periphery of said base section and the inner periphery of the lower opening of said one of said tubular members, each of said plant frames further comprising an open skeletal frame of a plurality of ribs secured in a spaced-apart relationship about the periphery of said base to upstand therefrom within and against the inner wall of said one of said tubular members.

2. In a tray construction as defined in claim 1, and means on said ribs of each of said plant frames engaging the inner walls of said tubular members for releasably holding each of said plant frames in one of said tubular members.

3. In a tray construction as defined in claim 2, wherein said means on said ribs of each of said plant frames comprises a ring integrally formed on the upper ends of said ribs, and said ring of each of said plant frames frictionally engaging the inner walls of said tubular members for releasably holding each of said plant frames in one of said tubular members.

4. In a tray construction as defined in claim 3, wherein said rings of each of said plant frames is circumferentially discontinuous.

5. In a tray construction as defined in claim 1, and leg means depending from the lower end of said tray frame for supporting said tray frame on a table-like surface with the lower ends of said tubular members a certain distance above said table-like surface.

6. In a tray construction as defined in claim 5, wherein said base section of each of said plant frames is positioned below the lower end of said tubular members, and said certain distance being great enough to prevent said table-like surface from engaging said base sections of said plant frames and moving said plant frames upwardly through said tubular members when said tray frame is placed upon said table-like surface.

7. In a tray construction as defined in claim 1, wherein the upper surface of said base section of each of said plant frames is domed upwardly.

8. In a tray construction as defined in claim 7, wherein the underside of the base section of each of said plant frames is formed to have a depending nose section of a ground penetrating configuration.

9. In a tray construction as defined in claim 8, wherein the base section of each of said plant frames further comprises an annular shoulder extending radially outwardly of said ribs at the lower ends thereof.

10. In a tray construction as defined in claim 9, wherein said nose section of said base section comprises a top wall, the peripheral portion of said top wall forming said annular shoulder of said base section, a split post on the center of said top wall and upstanding therefrom, and a hole in the center underside surface of the portion of said base section having said upwardly domed upper surface for receiving said split post therein to connect said nose section thereto.

11. In a tray construction as defined in claim 1, wherein said substantially rigid tubular members of said tray frame are molded as a unitary assembly from foamed thermoplastic material.

12. A tray construction for growing plants, said tray construction comprising a tray frame and a plurality of plant frames, said tray frame comprising a plurality substantially rigid tubular members open at both ends and having imperforate walls and being vertically aligned and integrally interconnected in a rectangular array in a plurality of adjacent rows with open air spaces between diagonally opposed tubular members, each of said plant frames being telescoped substantially within one of said tubular members, each of said plant frames comprising a base section devoid of any openings capable of passing water therethrough, the upper surface of each base section domed upwardly, the outer periphery of each base section positioned in a spaced relationship to the lower end of said one of said tubular members to provide a closed bottom wall across said lower end of said one of said tubular members, said spaced relationship defining drainage openings between the periphery of said base section and the inner periphery of the lower opening end of said one of said tubular members, said lower opening being of a diameter substantially that of the outer periphery of the base section and each of said plant frames further comprising open skeletal means on said base section for holding the root mass and growing medium of any plant growing in said tubular member against bending along the longitudinal axis thereof and for retaining the root mass and growing medium on said base section when one of said plant frames is withdrawn from one of said tubular members while providing a minimum of surface interference to root growth laterally outwardly thereof.

13. The tray construction of claim 1, wherein the base section of the plant frames is spaced axially downwardly from the lower opening of the tubular members.

14. The tray construction of claim 1, wherein the outer periphery of the base section is spaced radially inwardly from the last predetermined circumferentially spaced regions of the inner periphery of the lower opening.